(12) United States Patent
Izumikawa

(10) Patent No.: US 11,168,466 B2
(45) Date of Patent: Nov. 9, 2021

(54) SHOVEL, DISPLAY DEVICE OF SHOVEL, AND METHOD OF DISPLAYING IMAGE FOR SHOVEL

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO(S.H.I) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/583,811

(22) Filed: Sep. 26, 2019

(65) Prior Publication Data

US 2020/0018046 A1  Jan. 16, 2020

Related U.S. Application Data

(63) Continuation of application No. PCT/JP2018/012890, filed on Mar. 28, 2018.

(30) Foreign Application Priority Data

Mar. 31, 2017 (JP) .............................. JP2017-073253

(51) Int. Cl.
*E02F 9/26* (2006.01)
*E02F 3/32* (2006.01)
*G06T 11/60* (2006.01)

(52) U.S. Cl.
CPC ................ *E02F 9/261* (2013.01); *E02F 3/32* (2013.01); *E02F 9/264* (2013.01); *G06T 11/60* (2013.01)

(58) Field of Classification Search
CPC ... E02F 9/261; E02F 3/32; E02F 9/264; E02F 9/26; E02F 3/30; E02F 3/28; G06T 11/60
See application file for complete search history.

(56) References Cited

U.S. PATENT DOCUMENTS 5,169,616 A * 12/1992 Ross .................. D01D 4/02
                                                   264/29.2
7,630,872 B2 * 12/2009 Xia .................... G01V 1/40
                                                   703/10
(Continued)

FOREIGN PATENT DOCUMENTS

JP   H06-264476    9/1994
JP   H07-216928    8/1995
(Continued)

OTHER PUBLICATIONS

International Search Report for PCT/JP2018/012890 dated Jun. 12, 2018.

*Primary Examiner* — Jung-Mu T Chuang
(74) *Attorney, Agent, or Firm* — IPUSA, PLLC

(57) ABSTRACT

A shovel includes a lower traveling body, an upper turning body turnably mounted on the lower traveling body, an attachment attached to the upper turning body, and a display device provided in a cab mounted on the upper turning body. The display device is configured to display a first image and a second image. The first image includes a first graphic representing the position of a preset target work surface and a second graphic vertically arranged relative to the first graphic. The second graphic represents a change in the size of the distance between a working part of the attachment and the target work surface by changing an indicator position. The second image represents the change in the size of the distance by changing a display format in the same part. The first graphic is displayed at the same height as the second image.

13 Claims, 9 Drawing Sheets

(56) References Cited

U.S. PATENT DOCUMENTS

| | | | | |
|---|---|---|---|---|
| 8,032,409 | B1* | 10/2011 | Mikurak | G06Q 10/00 705/14.39 |
| 8,589,069 | B1* | 11/2013 | Lehman | G01C 21/20 701/438 |
| 8,942,895 | B2* | 1/2015 | Nomura | E02F 9/26 701/469 |
| 9,493,929 | B2* | 11/2016 | Kurihara | E02F 3/435 |
| 9,540,786 | B2* | 1/2017 | Ogawa | E02F 3/436 |
| 10,280,597 | B2* | 5/2019 | Izumikawa | E02F 9/26 |
| 10,590,630 | B2* | 3/2020 | Hasegawa | E02F 9/264 |
| 2004/0059705 | A1* | 3/2004 | Wittke | G06N 5/00 |
| 2006/0074561 | A1* | 4/2006 | Xia | G01V 1/40 702/6 |
| 2008/0133128 | A1* | 6/2008 | Koch | E02F 3/435 37/348 |
| 2011/0044505 | A1* | 2/2011 | Lim | F16P 3/142 382/103 |
| 2011/0178677 | A1* | 7/2011 | Finley | E02F 9/265 701/31.4 |
| 2011/0251768 | A1* | 10/2011 | Luo | G08G 1/16 701/70 |
| 2011/0288766 | A1* | 11/2011 | Nagasawa | G09B 29/106 701/533 |
| 2011/0295499 | A1* | 12/2011 | Nozoe | G01C 21/3635 701/457 |
| 2012/0026111 | A1* | 2/2012 | Kasahara | G06F 3/0485 345/173 |
| 2013/0033493 | A1* | 2/2013 | Kiyota | G06T 3/0062 345/420 |
| 2013/0066527 | A1* | 3/2013 | Mizuochi | B66C 23/905 701/50 |
| 2013/0169690 | A1* | 7/2013 | Gotou | G09G 5/373 345/660 |
| 2013/0321608 | A1* | 12/2013 | Ninomiya | G06F 3/013 348/78 |
| 2014/0058635 | A1* | 2/2014 | Furukawa | B60R 16/02 701/50 |
| 2014/0100712 | A1* | 4/2014 | Nomura | E02F 9/264 701/1 |
| 2014/0100744 | A1* | 4/2014 | Johnson | E02F 3/3677 701/50 |
| 2014/0107917 | A1* | 4/2014 | Kazawa | G01C 21/3644 701/426 |
| 2014/0167971 | A1* | 6/2014 | Stanley | G01G 19/083 340/666 |
| 2014/0178841 | A1* | 6/2014 | Carter | F41A 33/00 434/19 |
| 2014/0260225 | A1* | 9/2014 | Harms | E02F 9/2228 60/327 |
| 2014/0267731 | A1* | 9/2014 | Izumikawa | B60R 1/00 348/148 |
| 2014/0271074 | A1* | 9/2014 | Ogawa | E02F 3/436 414/687 |
| 2014/0291038 | A1* | 10/2014 | Hague | G01G 5/04 177/1 |
| 2015/0004572 | A1* | 1/2015 | Borner | G09B 9/042 434/219 |
| 2015/0029017 | A1* | 1/2015 | Thoreson | B60K 35/00 340/461 |
| 2015/0240453 | A1* | 8/2015 | Jaliwala | E02F 9/264 701/50 |
| 2015/0324093 | A1* | 11/2015 | Wada | G06F 3/0481 715/763 |
| 2015/0345114 | A1* | 12/2015 | Nomura | G01S 19/43 37/379 |
| 2015/0352956 | A1* | 12/2015 | Miuchi | B60W 40/10 701/41 |
| 2016/0010312 | A1* | 1/2016 | Kurihara | E02F 9/261 701/36 |
| 2016/0069044 | A1* | 3/2016 | Takaura | E02F 9/2012 701/50 |
| 2016/0125666 | A1* | 5/2016 | Izumikawa | F01N 3/2066 60/301 |
| 2016/0193920 | A1* | 7/2016 | Tsubone | E02F 9/16 701/36 |
| 2016/0292920 | A1* | 10/2016 | Sprock | G06T 13/20 |
| 2017/0175362 | A1* | 6/2017 | Iwanaga | G01S 19/43 |
| 2018/0016771 | A1* | 1/2018 | Izumikawa | E02F 9/264 |
| 2018/0051446 | A1* | 2/2018 | Yoshinada | B60R 1/00 |
| 2018/0094408 | A1* | 4/2018 | Shintani | G01C 9/04 |
| 2018/0096159 | A1* | 4/2018 | Jacobson | G06F 21/6218 |
| 2018/0164994 | A1* | 6/2018 | Junck | G06F 3/0488 |
| 2018/0191960 | A1* | 7/2018 | Hatakeyama | H04N 5/2224 |
| 2018/0218304 | A1* | 8/2018 | Shike | G06Q 10/06313 |

FOREIGN PATENT DOCUMENTS

| | | |
|---|---|---|
| JP | 2014-101664 | 6/2014 |
| JP | 2014-129676 | 7/2014 |
| WO | 2016/158539 | 10/2016 |

* cited by examiner

SHOVEL, DISPLAY DEVICE OF SHOVEL, AND METHOD OF DISPLAYING IMAGE FOR SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/012890, filed on Mar. 28, 2018 and designating the U.S., which claims priority to Japanese patent application No. 2017-073253, filed on Mar. 31, 2017. The entire contents of the foregoing applications are incorporated herein by reference.

BACKGROUND

Technical Field

The present disclosure relates to shovels, display devices of shovels, and methods of displaying an image for shovels.

Description of Related Art

An excavation machine that displays graphic information, a front view, and a side view on the same screen of a display device has been known. The graphic information indicates the distance between the blade edge of a bucket and a design surface by an index bar and an index mark. The index bar is formed of vertically arranged blocks, and represents the magnitude of a distance from the design surface by representing each block by a different color. The index mark represents the height of the design surface and is correlated with one of the blocks. In the front view, the icon of the bucket as viewed from the front, a line indicating the design surface as viewed from the front, and distance information and angle information as numerical information related to a view from the front are displayed. In the side view, the icon of the bucket as viewed from the side, a line indicating the design surface as viewed from the side, and distance information and angle information as numerical information related to a view from the side are displayed.

SUMMARY

According to an aspect of the present invention, a shovel includes a lower traveling body, an upper turning body turnably mounted on the lower traveling body, an attachment attached to the upper turning body, and a display device provided in a cab mounted on the upper turning body. The display device is configured to display a first image and a second image. The first image includes a first graphic representing the position of a preset target work surface and a second graphic vertically arranged relative to the first graphic. The second graphic represents a change in the size of the distance between a working part of the attachment and the target work surface by changing an indicator position. The second image represents the change in the size of the distance by changing a display format in the same part. The first graphic is displayed at the same height as the second image.

DETAILED DESCRIPTION

According to the above-described excavation machine, the index mark and the icon of the bucket as viewed from the front are displayed at different levels on the screen. Therefore, for example, while operating the shovel looking at the graphic information, the operator has to shift the line of sight upward from the index mark to look at the front view when checking the misalignment between a tooth tip line in a width direction of the bucket and the design surface.

The operator performing work looking at the teeth tips of the bucket, however, usually captures information items on the display device in her/his peripheral vision. Therefore, when the information items are displayed at different levels on the screen, it may be impossible to determine the misalignment between the tooth tip line in a width direction of the bucket and the design surface.

Thus, it is desirable to provide a shovel that enables an operator to more easily understand information related to a machine guidance function or a machine control function displayed on a display screen.

According to an aspect of the present invention, a shovel that enables an operator to more easily understand information related to a machine guidance function or a machine control function displayed on a display screen is provided.

Figure 1:
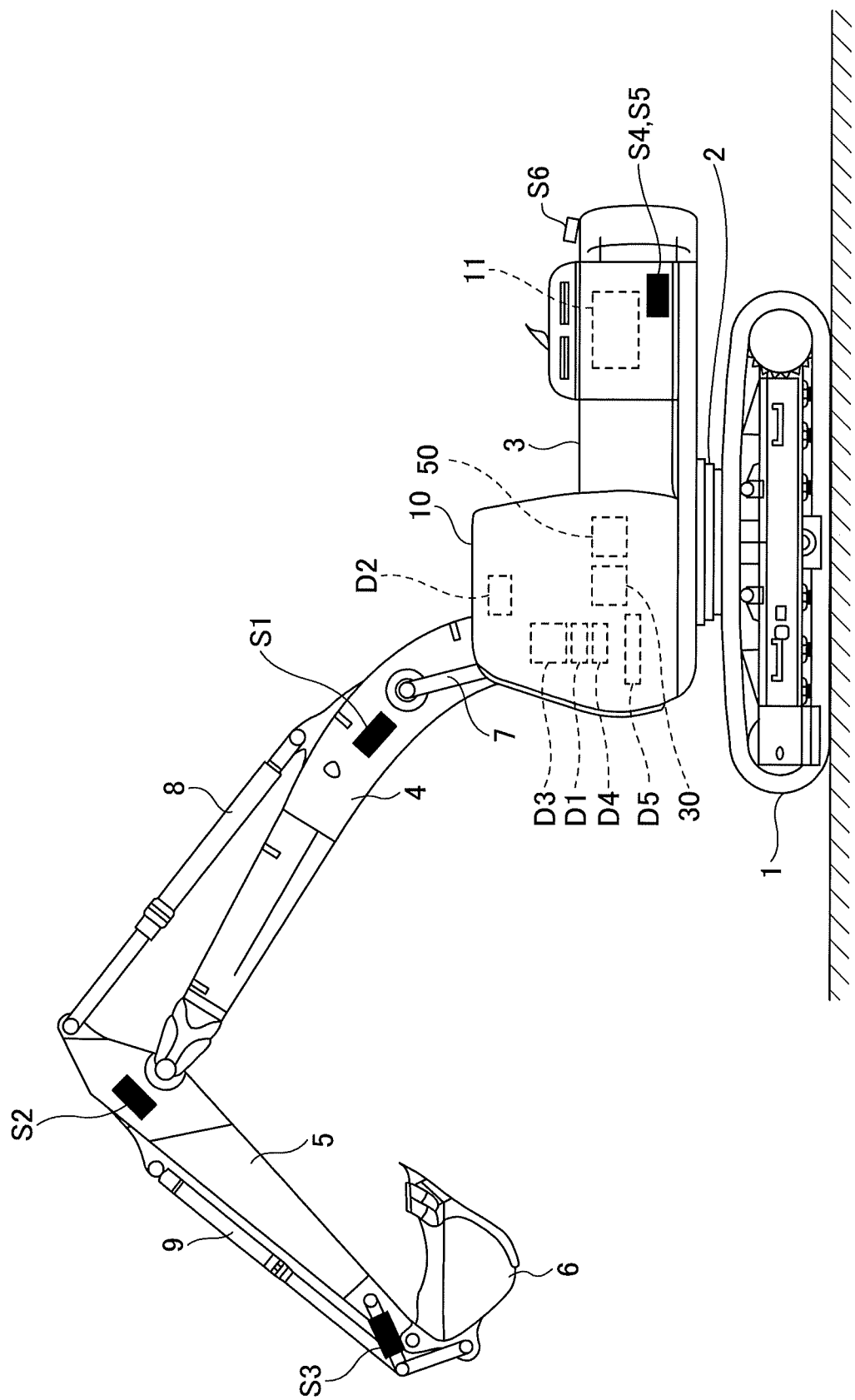
FIG. 1 is a side view of a shovel according to an embodiment of the present invention.

FIG. 1 is a side view of a shovel (excavator) according to an embodiment of the present invention. An upper turning body 3 is turnably mounted on a lower traveling body 1 of the shovel via a turning mechanism 2. A boom 4 is attached to the upper turning body 3. An arm 5 is attached to the end of the boom 4. A bucket 6 serving as an end attachment is attached to the end of the arm 5. A slope bucket, a dredging bucket or the like may alternatively be used as an end attachment.

The boom 4, the arm 5, and the bucket 6 form an excavation attachment as an example of an attachment. The boom 4 is driven by a boom cylinder 7, the arm 5 is driven by an arm cylinder 8, and the bucket 6 is driven by a bucket cylinder 9. A boom angle sensor S1 is attached to the boom 4. An am angle sensor S2 is attached to the arm 5. A bucket angle sensor S3 is attached to the bucket 6. A bucket tilt mechanism may be provided on the excavation attachment.

The boom angle sensor S1 detects the rotation angle of the boom 4. According to this embodiment, the boom angle sensor S1 is an acceleration sensor that detects the rotation angle of the boom 4 relative to the upper turning body 3 by detecting an inclination to a horizontal plane.

The arm angle sensor S2 detects the rotation angle of the arm 5. According to this embodiment, the arm angle sensor S2 is an acceleration sensor that detects the rotation angle of the arm 5 relative to the boom 4 by detecting an inclination to a horizontal plane.

The bucket angle sensor S3 detects the rotation angle of the bucket 6. According to this embodiment, the bucket angle sensor S3 is an acceleration sensor that detects the rotation angle of the bucket 6 relative to the arm 5 by detecting an inclination to a horizontal plane. When the excavation attachment is provided with a bucket tilt mechanism, the bucket angle sensor S3 may additionally detect the rotation angle of the bucket 6 about a tilt axis.

The boom angle sensor S1, the arm angle sensor S2, and the bucket angle sensor S3 may be a combination of an acceleration sensor and a gyro sensor, or may be potentiometers using a variable resistor, stroke sensors that detect the stroke amount of a corresponding hydraulic cylinder, or rotary encoders that detect a rotation angle about a link pin. The boom angle sensor S1, the arm angle sensor S2, and the bucket angle sensor S3 form a posture sensor that detects information on the posture of the excavation attachment. The posture sensor may detect information on the posture of the excavation attachment by combining the output of a gyro sensor.

A cabin 10 serving as a cab is provided and a power source such as an engine 11 is mounted on the upper turning body 3. Furthermore, a body tilt sensor S4, a turning angular velocity sensor S5, and a camera S6 are attached to the upper turning body 3.

The body tilt sensor S4 detects the inclination of the upper turning body 3 to a horizontal plane. According to this embodiment, the body tilt sensor S4 is a two-axis acceleration sensor that detects the tilt angle of the upper turning body 3 around its longitudinal axis and lateral axis. For example, the longitudinal axis and the lateral axis of the upper turning body 3 are perpendicular to each other and pass the center point of the shovel that is a point on the turning axis of the shovel.

The turning angular velocity sensor S5 is, for example, a gyro sensor, and detects the turning angular velocity of the upper turning body 3. The turning angular velocity sensor S5 may alternatively be a resolver, a rotary encoder, or the like.

The camera S6 is a device that obtains an image of an area surrounding the shovel. According to this embodiment, the camera S6 is one or more cameras attached to the upper turning body 3.

An input device D1, an audio output device D2, a display device D3, a storage device D4, a gate lock lever D5, a controller 30, and a machine guidance device 50 are installed in the cabin 10.

The controller 30 operates as a main control part that controls the driving of the shovel. According to this embodiment, the controller 30 is composed of a processing unit including a CPU and an internal memory. The CPU executes a program stored in the internal memory to implement various functions of the controller 30.

The machine guidance device 50 executes a machine guidance function and guides shovel operations. According to this embodiment, for example, the machine guidance device 50 visually and aurally notifies an operator of a vertical distance between a target work surface preset by the operator and the leading edge position of the bucket 6. The leading edge position of the bucket 6 is, for example, a tooth tip position. According to this configuration, the machine guidance device 50 can guide shovel operations by the operator. The machine guidance device 50 may only visually or only aurally notify the operator of the distance.

Specifically, like the controller 30, the machine guidance device 50 is composed of a processing unit including a CPU and an internal memory. The CPU executes a program stored in the internal memory to implement various functions of the machine guidance device 50. The machine guidance device 50 may be incorporated in the controller 30.

The machine guidance device 50 may execute a machine control function to automatically assist shovel operations by the operator. For example, during an excavating operation by the operator, the machine guidance device 50 assists the motion of the boom 4, the arm 5, and the bucket 6 such that the target work surface coincides with the leading edge position of the bucket 6. For example, during an arm closing operation by the operator, the machine guidance device 50 automatically extends or retracts at least one of the boom cylinder 7 and the bucket cylinder 9 to make the target work surface coincide with the leading edge position of the bucket 6. In this case, only by operating a single operating lever, the operator can simultaneously move the boom 4, the arm 5, and the bucket 6 to perform excavation work while making the target work surface coincide with the leading edge position of the bucket 6.

The input device D1 is so configured as to enable the operator of the shovel to input information to the machine guidance device 50. According to this embodiment, the input device D1 is a membrane switch attached to the periphery of the display device D3. A touchscreen may be used as the input device D1.

The audio output device D2 outputs audio information in response to a command from the machine guidance device 50. According to this embodiment, a loudspeaker directly connected to the machine guidance device 50 is used as the audio output device D2. An alarm such as a buzzer may be used as the audio output device D2.

The display device D3 outputs various kinds of image information in response to a command from the machine guidance device 50. According to this embodiment, a liquid crystal display directly connected to the machine guidance device 50 is used as the display device D3. A camera image captured by the camera S6 may be displayed on the display device D3. The display device D3 may be a projector installed in the cabin 10.

The storage device D4 is configured to store information. According to this embodiment, a non-volatile storage medium such as a semiconductor memory is used as the storage device D4. For example, the storage device D4 stores information output by the controller 30, the machine guidance device 50, etc., such as shovel-related data and design data.

The gate lock lever D5 is configured to prevent the shovel from being accidentally operated. According to this embodiment, the gate lock lever D5 is provided between the door and the operator seat of the cabin 10. When the gate lock lever D5 is pulled up to prevent the operator from exiting the cabin 10, various operating apparatuses are enabled. When the gate lock lever D5 is pushed down to allow the operator to exit the cabin 10, various operating apparatuses are disabled.

Figure 2:
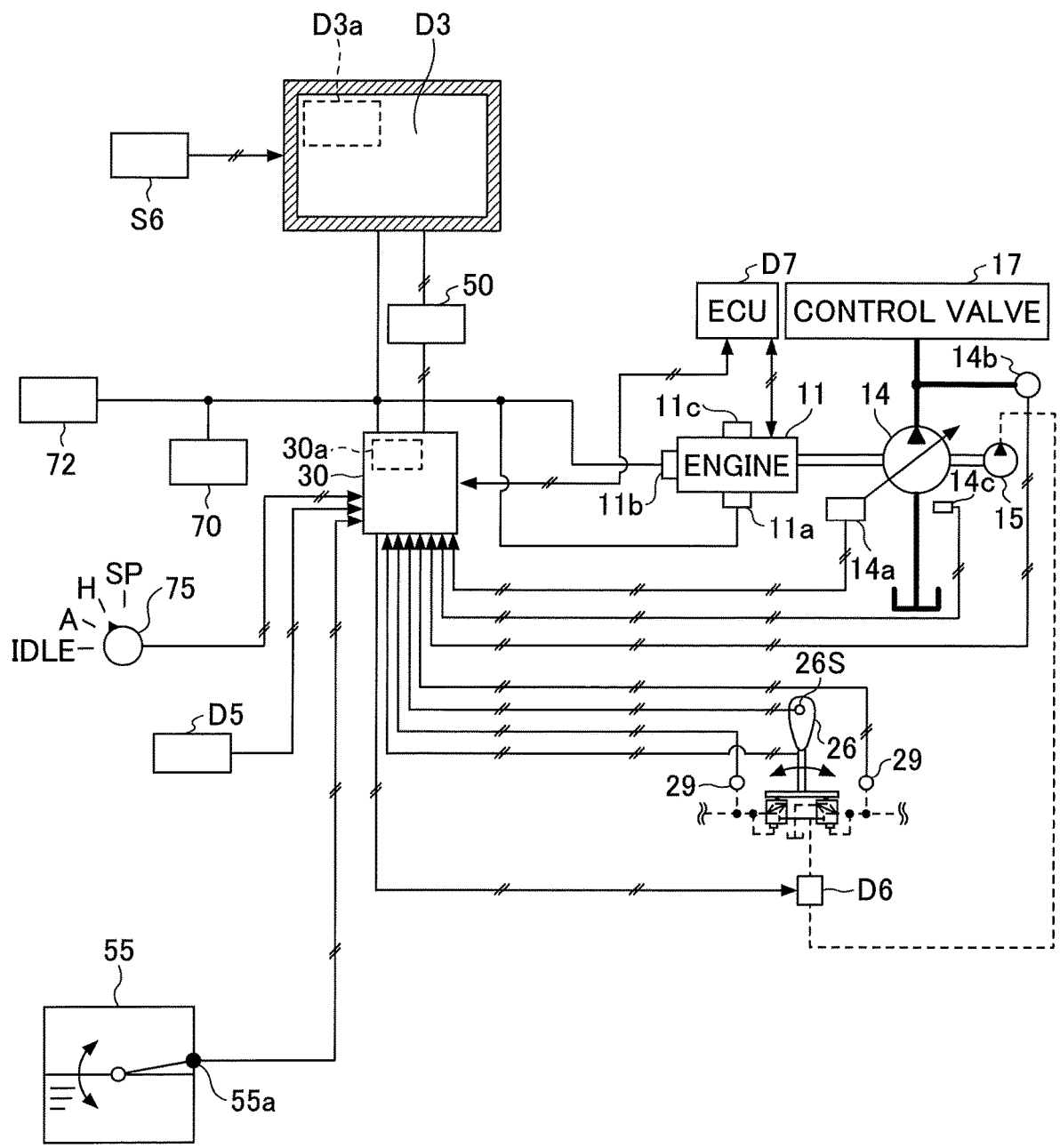
FIG. 2 is a diagram illustrating a configuration of the drive control system of the shovel of FIG. 1.

FIG. 2 is a diagram illustrating an example configuration of the drive control system of the shovel of FIG. 1. In FIG. 2, a mechanical power transmission system, a hydraulic oil line, a pilot line, and an electric drive and control system are indicated by a double line, a thick solid line, a dashed line, and a thin solid line, respectively.

The engine 11 is a drive source of the shovel. According to this embodiment, the engine 11 is a diesel engine that adopts isochronous control to maintain a constant engine rotational speed irrespective of an increase or decrease in an engine load. The amount of fuel injection, the timing of fuel injection, boost pressure, etc., in the engine 11 are controlled by an engine controller unit D7.

A main pump 14 and a pilot pump 15 serving as hydraulic pumps have respective rotating shafts connected to the rotating shaft of the engine 11. A control valve 17 is connected to the main pump 14 via a hydraulic oil line.

The control valve 17 is a hydraulic controller that controls the hydraulic system of the shovel. Hydraulic actuators are connected to the control valve 17 through hydraulic lines. Hydraulic actuators include left and right traveling hydraulic motors, the boom cylinder 7, the arm cylinder 8, the bucket cylinder 9, and a turning hydraulic motor.

An operating apparatus 26 is connected to the pilot pump 15 via a pilot line and a gate lock valve D6. The operating apparatus 26 includes operating levers and operating pedals. Furthermore, the operating apparatus 26 is connected to the control valve 17 via a pilot line.

A knob switch serving as a switch 26S is provided at the end of an operating lever serving as the operating apparatus 26. The operator can operate the knob switch with a finger without releasing her/his hand from the operating lever. The switch 26S may alternatively be a pedal switch. In this case, the operator can operate the pedal switch with her/his foot without releasing her/his hand from the operating lever.

The gate lock valve D6 is configured to enable the switching of opening and closing of a pilot line connecting the pilot pump 15 and the operating apparatus 26. According to this embodiment, the gate lock valve D6 is a solenoid valve that switches opening and closing of the pilot line in response to a command from the controller 30. The controller 30 determines the state of the gate lock lever D5 based on a state signal output by the gate lock lever D5. In response to determining that the gate lock lever D5 is pulled up, the controller 30 outputs an OPEN signal to the gate lock valve D6. In response to receiving the OPEN signal, the gate lock valve D6 opens to open the pilot line. As a result, the operating apparatus 26 is enabled for the operator's operation. In response to determining that that the gate lock lever D5 is pulled down, the controller 30 outputs a CLOSE signal to the gate lock valve D6. In response to receiving the CLOSE signal, the gate lock valve D6 closes to close the pilot line. As a result, the operating apparatus 26 is disabled for the operator's operation.

A pressure sensor 29 detects the details of operation of the operating apparatus 26 in the form of pressure. The pressure sensor 29 outputs a detection value to the controller 30. The details of operation of the operating apparatus 26 may be detected using another sensor.

Furthermore, FIG. 2 illustrates a connection relationship between the controller 30 and the display device D3. According to this embodiment, the display device D3 is connected to the controller 30 via the machine guidance device 50. The display device D3, the machine guidance device 50, and the controller 30 may be connected via a communications network such as a CAN.

The display device D3 includes a conversion part D3a that generates an image. According to this embodiment, the conversion part D3a generates a camera image to be displayed based on the output of the camera S6. The camera S6 is connected to the display device D3 via a dedicated line, for example.

Furthermore, the conversion part D3a generates an image to be displayed based on the output of the controller 30 or the machine guidance device 50. According to this embodiment, the conversion part D3a converts information output by the controller 30 or the machine guidance device 50 into an image signal. The output information of the controller 30 include, for example, at least one of data on the temperature of engine coolant water, data on the temperature of hydraulic oil, data on the remaining amount of fuel, and data on the remaining amount of an aqueous urea solution. The output information of the machine guidance device 50 include, for example, at least one of data indicating the leading edge position of the bucket 6 and data on a target work surface.

The conversion part D3a may be implemented not as a function of the display device D3 but as a function of the controller 30 or the machine guidance device 50. In this case, the camera S6 is connected to not the display device D3 but the controller 30 or the machine guidance device 50.

The display device D3 is configured to be supplied with electric power from a rechargeable battery 70 to operate. The rechargeable battery 70 is charged with electric power generated in an alternator 11a (generator) of the engine 11, for example. The electric power of the rechargeable battery 70 may also be supplied to electrical equipment 72, etc., of the shovel besides the controller 30 and the display device D3. A starter 11b of the engine 11 may be driven with electric power from the rechargeable battery 70 to start the engine 11. The engine 11 is configured to be controlled by the engine controller unit D7. The engine controller unit D7 transmits data on the condition of the engine 11 to the controller 30. The data on the condition of the engine 11 are an example of the operating information of the shovel, and include, for example, data on a coolant water temperature detected at a water temperature sensor 11c serving as an operating information obtaining part. The controller 30 may store these data in a temporary storage part (memory) 30a and transmit the data to the display device D3 when necessary.

Furthermore, the controller 30 may be fed with various data as the operating information of the shovel as follows. These data may be stored in the temporary storage part 30a of the controller 30.

For example, a regulator 14a of the main pump 14, which is a variable displacement hydraulic pump, may feed the controller 30 with data on a swash plate tilt angle. Furthermore, a discharge pressure sensor 14b may feed the controller 30 with data on the discharge pressure of the main pump 14. These data may be stored in the temporary storage part 30a. An oil temperature sensor 14c may be provided in a conduit between the main pump 14 and a tank storing hydraulic oil that the main pump 14 draws in. The oil temperature sensor 14c may feed the controller 30 with data on the temperature of hydraulic oil flowing through the conduit. The regulator 14a, the discharge pressure sensor 14b, and the oil temperature sensor 14c are specific examples of the operating information obtaining part.

A contained fuel amount detecting part 55a in a fuel containing part 55 may feed the controller 30 with data indicating the amount of contained fuel. According to this embodiment, a remaining fuel amount sensor serving as the contained fuel amount detecting part 55a in a fuel tank serving as the fuel containing part 55 feeds the controller 30 with data on the state of the remaining amount of fuel.

Specifically, the remaining fuel amount sensor is composed of a float that follows a liquid surface and a variable resistor (potentiometer) that converts a vertical variation of the float into a resistance value. This configuration makes it possible for the remaining fuel amount sensor to have the state of the remaining amount of fuel steplessly displayed on the display device D3. The detection method of the contained fuel amount detecting part 55a may be suitably selected in accordance with a usage environment, etc. A detection method that makes it possible to display the amount of remaining fuel in a stepwise manner may be adopted. These configurations may also be applied to an aqueous urea solution tank.

When the operating apparatus 26 is operated, the pressure sensor 29 detects a pilot pressure that acts on the control valve 17. The pressure sensor 29 feeds the controller 30 with data on the detected pilot pressure.

According to this embodiment, the shovel has an engine rotational speed adjustment dial 75 provided in the cabin 10. The engine rotational speed adjustment dial 75 is a dial for adjusting the rotational speed of the engine 11, and is configured to make it possible to switch the engine rotational speed among four levels. The engine rotational speed adjustment dial 75 transmits data on the setting of the engine rotational speed to the controller 30. The engine rotational speed adjustment dial 75 can switch the engine rotational speed among the four levels of SP mode, H mode, A mode, and idling mode. FIG. 2 illustrates a state where the H mode is selected by the engine rotational speed adjustment dial 75.

The SP mode is a rotational speed mode selected when it is desired to prioritize workload, and uses the highest engine rotational speed. The H mode is a rotational speed selected when it is desired to balance workload and fuel efficiency, and uses the second highest engine rotational speed. The A mode is a rotational speed selected when it is desired to operate the shovel at low noise while prioritizing fuel efficiency, and uses the third highest engine rotational speed. The idling mode is a rotational speed selected when it is desired to idle the engine, and uses the lowest engine rotational speed. The engine 11 is controlled to a constant rotational speed at the engine rotational speed of the rotational speed mode set by the engine rotational speed adjustment dial 75.

Figure 3:
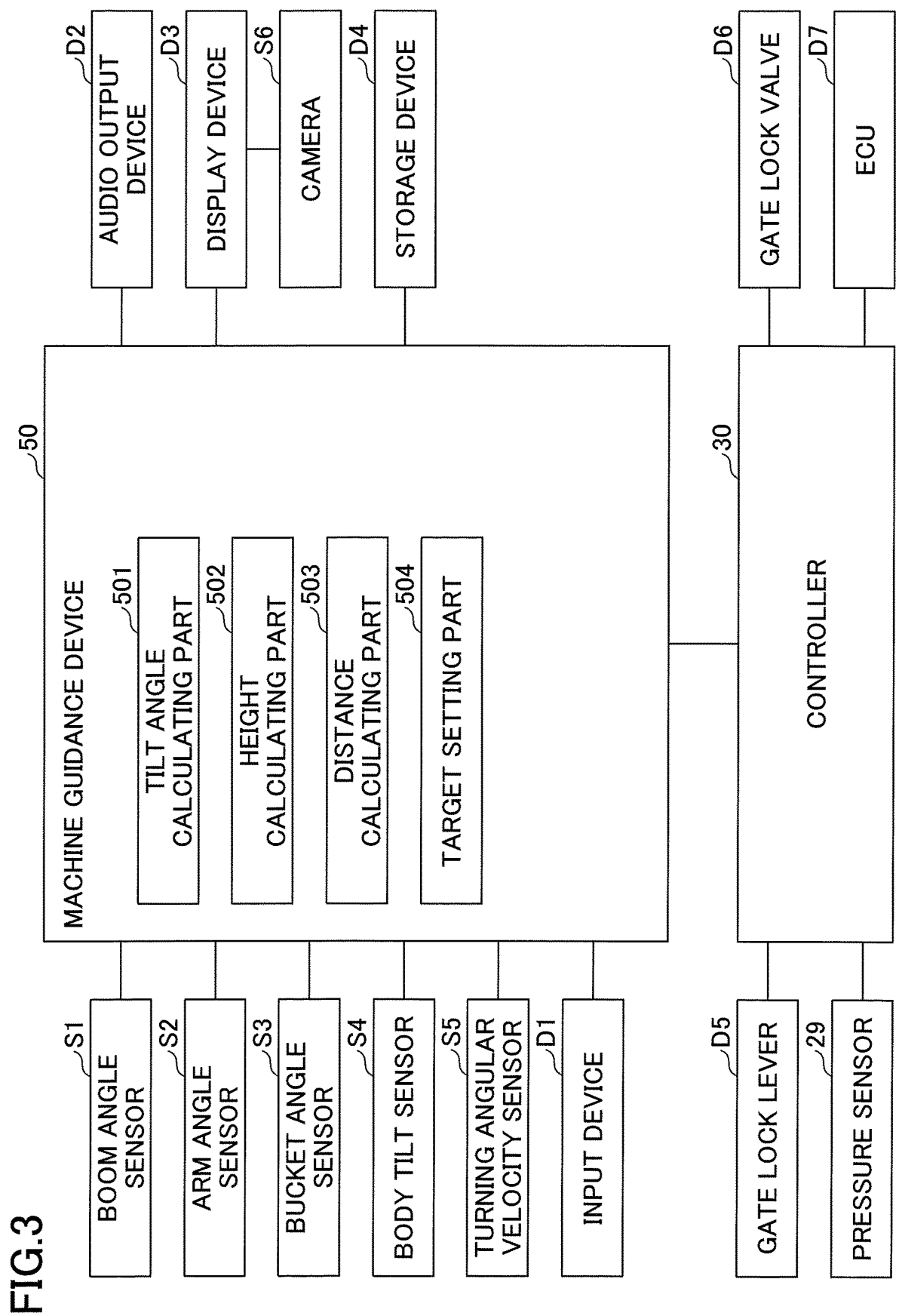
FIG. 3 is a block diagram illustrating an example configuration of a machine guidance device.

Next, various functional elements of the machine guidance device 50 are described with reference to FIG. 3. FIG. 3 is a functional block diagram illustrating an example configuration of the machine guidance device 50. The machine guidance device 50 is configured to be able to receive the output information of at least one of the boom angle sensor S1, the arm angle sensor S2, the bucket angle sensor S3, the body tilt sensor S4, the turning angular velocity sensor S5, the input device the controller 30, etc. The machine guidance device 50 is configured to be able to execute various operations based on the received information and information stored in the storage device D4 and to output the operation results to at least one of the audio output device D2, the display device D3, etc.

For example, the machine guidance device 50 is configured to calculate the height of the working part of the attachment and to output a control command commensurate with the size of the distance between the height of the working part and a predetermined target height to at least one of the audio output device D2 and the display device D3. In response to receiving the control command, the audio output device D2 outputs audio that represents the size of the distance. In response to receiving the control command, the display device D3 displays an image that represents the size of the distance. The target height is a concept including a target depth, and is a height that the operator inputs as a vertical distance relative to a reference position after causing the working part to contact the reference position, for example. The reference position typically has a known latitude, longitude, and altitude.

Hereinafter, information on the size of the distance between the height of the working part of the attachment and the target height displayed on the display device D3 is referred to as "working part guidance information." The operator can proceed with work while checking the transition of the size of the distance by looking at the working part guidance information.

To perform the above-described guidance, the machine guidance device 50 includes a tilt angle calculating part 501, a height calculating part 502, a distance calculating part 503, and a target setting part 504.

For example, the tilt angle calculating part 501 is configured to calculate the tilt angle of the shovel, which is the tilt angle of the upper turning body 3 relative to a horizontal plane, based on a detection signal from the body tilt sensor S4.

The height calculating part 502 is configured to calculate the height of the working part of the attachment relative to a reference plane based on the tilt angle calculated by the tilt angle calculating part 501 and the respective rotation angles of the boom 4, the arm 5, and the bucket 6. The reference plane is, for example, a virtual plane including a plane in which the shovel is positioned. According to this embodiment, because excavation is performed with the leading edge of the bucket 6, the leading edge (tooth tip) of the bucket 6 corresponds to the working part of the attachment. In the case of performing work such as leveling soil with the back surface of the bucket 6, the back surface of the bucket 6 corresponds to the working part of the attachment.

For example, the distance calculating part 503 is configured to calculate the distance between the height of the working part calculated by the height calculating part 502 and a target height. According to this embodiment, the distance calculating part 503 calculates the distance between the height of the leading edge (tooth tip) of the bucket 6 calculated by the height calculating part 502 and a target height.

For example, the target setting part 504 is configured to set a target value used by the machine guidance function or the machine control function. The target setting part 504 sets the target value based on information on the positions of a predetermined portion of the excavation attachment at two points of time, for example. Then, based on the position coordinates of the leading edge of the bucket 6 at the two points of time, the target setting part 504 may calculate the angle formed between a virtual straight line passing through these two coordinate points and a horizontal plane and set the angle as a target slope angle. Each of the two points of time is, for example, a point of time at which a predetermined condition is satisfied. The point of time at which a predetermined condition is satisfied includes, for example, at least one of a point of time at which a predetermined switch is depressed, a point of time at which a predetermined time has passed with the excavation attachment remaining stationary, etc. The target slope angle may include zero degrees.

The setting part 504 may be configured to display geometric information on the display device D3, using information on the positions of a predetermined portion of the excavation attachment at two points of time. The geometric information is, for example, information on the results of measurement by the shovel. For example, based on the position coordinates of the leading edge of the bucket 6 at two points of time, the target setting part 504 may display the angle formed between a virtual straight line passing through these two coordinate points and a horizontal plane as geometric information on the display device D3. The two coordinate points may be directly displayed as geometric information, and the horizontal distance and the vertical distance between the two coordinate points may be displayed as geometric information. Here, of the two points of time, a first point of time is a point of time at which a predetermined condition is satisfied as described above, and a second point of time is a current point of time. Thus, the geometric information may be displayed in order to have the operator recognize the positional relationship between the coordinate point of the predetermined portion recorded at the first point of time and the coordinate point of the predetermined portion at the current point of time.

Figure 4:
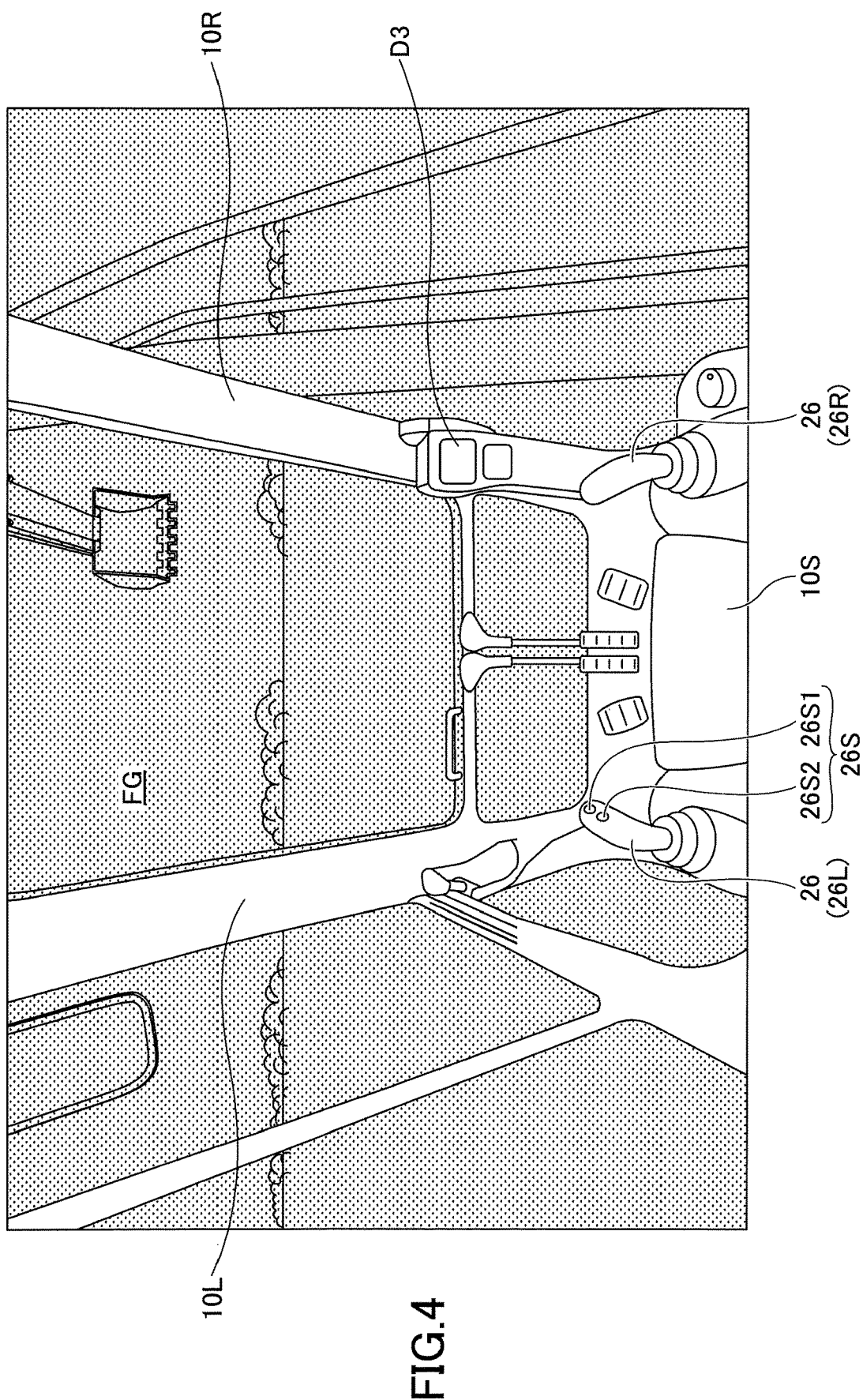
FIG. 4 is a perspective view of the inside of a cabin.

Next, examples of the attachment positions of various devices provided in the cabin 10 are described with reference to FIG. 4. FIG. 4 is a perspective view of the inside of the cabin 10, illustrating a forward looking view from an operator seat 10S of the shovel. In the illustration of FIG. 4, there are a left pillar 10L and a right pillar 10R, and the display device D3 is attached to the right pillar 10R in such a manner as to fit within the width of the right pillar 10R on the front right of the operator seat 10S, in order to enable the operator sitting in the operator seat facing the front to look at the display device D3 during work, specifically, to enable the operator to capture the display device D3 in her/his peripheral vision when having the bucket 6 in the center of her/his visual field through a windshield FG.

Operating levers serving as the operating apparatus 26 include a left operating lever 26L and a right operating lever 26R. The switch 26S is provided at the end of the left operating lever 26L. The operator can operate the switch 26S with a finger without releasing her/his hand from the operating lever. The switch 26S may alternatively be provided at the end of the right operating lever 26R or provided at the end of each of the left operating lever 26L and the right operating lever 26R.

According to the illustration of FIG. 4, the switch 26S includes a reference setting button 26S1 and a measurement mode button 26S2. The reference setting button 26S1 is a button for setting a reference position. The measurement mode button 26S2 is a button for starting or ending a measurement mode.

The measurement mode is one of the operating modes of the shovel. The operating modes of the shovel include the measurement mode and a guidance mode.

The measurement mode is an operating mode that is selected when performing measurement using the shovel. According to this embodiment, the measurement mode starts when the measurement mode button 26S2 is depressed. The measurement mode is also selected when setting a target value used in the machine guidance function or the machine control function.

The guidance mode is an operating mode that is selected when executing the machine guidance function or the machine control function. According to this embodiment, the guidance mode starts when a guidance mode button (not depicted) is depressed. The guidance mode is selected, for example, when forming a slope with the shovel.

Figure 5:
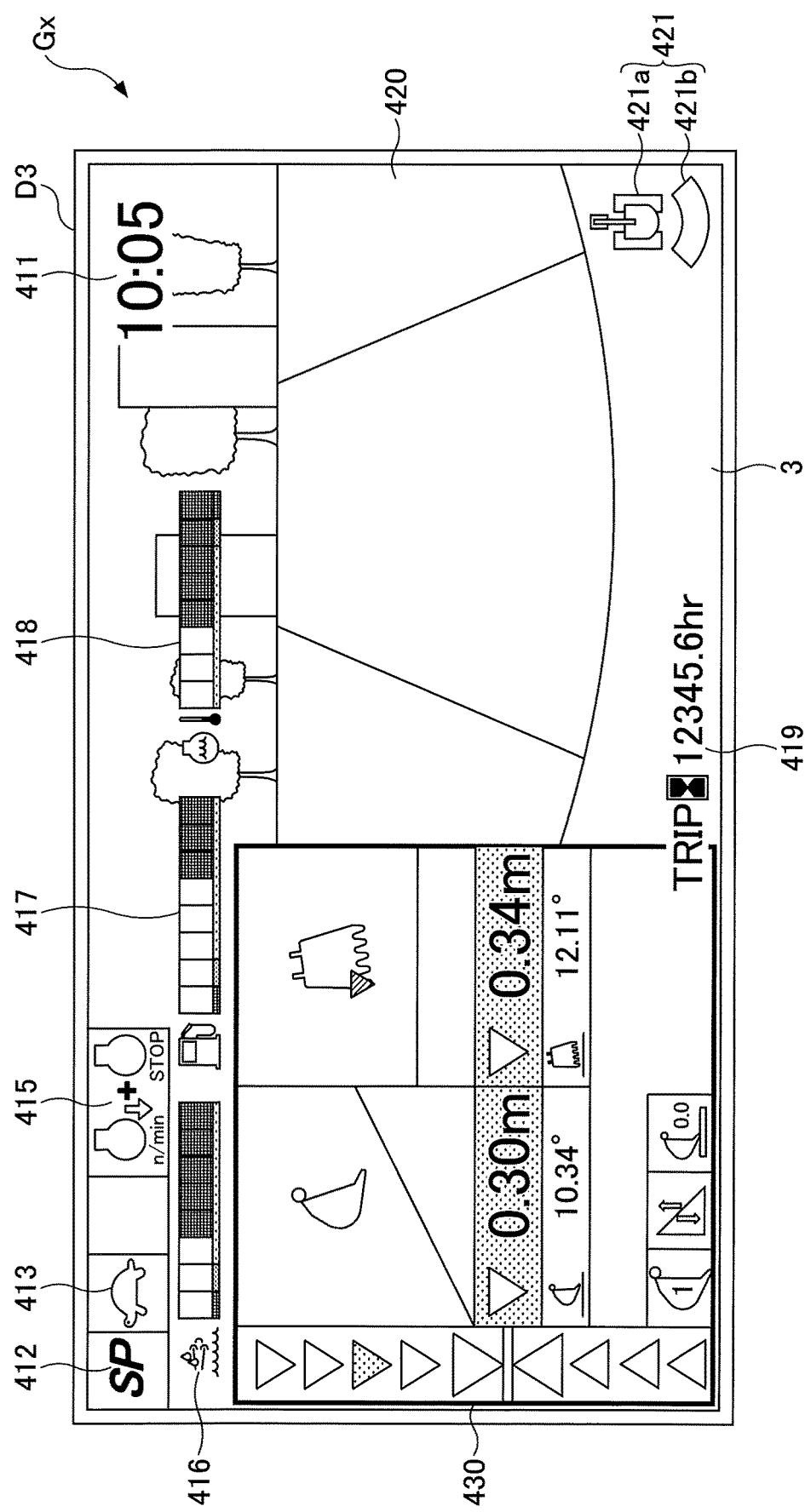
FIG. 5 is a diagram illustrating an example of an output image displayed during a guidance mode.

Next, an output image displayed during the guidance mode is described with reference to FIG. 5. FIG. 5 illustrates an example of an output image Gx that is displayed on the display device D3 during the guidance mode. In the illustration of FIG. 5, a reference position and a target work surface are already set.

As illustrated in FIG. 5, the output image Gx displayed on the display device D3 includes a time display part 411, a rotational speed mode display part 412, a travel mode display part 413, an engine control status display part 415, a remaining aqueous urea solution amount display part 416, a remaining fuel amount display part 417, a coolant water temperature display part 418, an engine operating time display part 419, a camera image display part 420, and a work guidance display part 430. The rotational speed mode display part 412, the travel mode display part 413, and the engine control status display part 415 are a display part that displays information on the settings of the shovel. The remaining aqueous urea solution amount display part 416, the remaining fuel amount display part 417, the coolant water temperature display part 418, and the engine operating time display part 419 are a display part that displays information on the operating condition of the shovel. Images displayed in the respective parts are generated by the conversion part D3a of the display device D3, using data transmitted from the controller 30 or the machine guidance device 50 and a camera image transmitted from the camera S6.

The time display part 411 displays a current time. According to the illustration of FIG. 5, a digital display is employed, and a current time (10:05) is displayed.

The rotational speed mode display part 412 displays a rotational speed mode set by the engine rotational speed adjustment dial 75 as an image as operating information of the shovel. The rotational speed mode includes, for example, the above-described four modes of SP mode, H mode, A mode, and idling mode. According to the illustration of FIG. 5, a symbol "SP" representing the SP mode is displayed.

The travel mode display part 413 displays a travel mode as operating information of the shovel. The travel mode represents the setting of traveling hydraulic motors using a variable displacement motor. For example, the travel mode includes a low-speed mode and a high-speed mode. A "turtle"-shaped mark is displayed in the low-speed mode, and a "rabbit"-shaped mark is displayed in the high-speed mode. According to the illustration of FIG. 5, the "turtle"-shaped mark is displayed to make it possible for the operator to recognize that the low-speed mode is set.

The engine control status display part 415 displays the control status of the engine 11 as operating information of the shovel. According to the illustration of FIG. 5, "automatic deceleration and automatic stop mode" is selected as the control status of the engine 11. The "automatic deceleration and automatic stop mode" means a control status to automatically reduce the engine rotational speed and further to automatically stop the engine 11 in accordance with the duration of a non-operating condition. Other control statuses of the engine 11 include "automatic deceleration mode," "automatic stop mode," "manual deceleration mode," etc.

The remaining aqueous urea solution amount display part 416 displays the status of the remaining amount of an aqueous urea solution stored in an aqueous urea solution tank as an image as operating information of the shovel. According to the illustration of FIG. 5, a bar gauge representing a current status of the remaining amount of an aqueous urea solution is displayed. The remaining amount of an aqueous urea solution is displayed based on the output data of a remaining aqueous urea solution amount sensor provided in the aqueous urea solution tank.

The remaining fuel amount display part 417 displays the status of the remaining amount of fuel stored in a fuel tank as operating information of the shovel. According to the illustration of FIG. 5, a bar gauge representing a current status of the remaining amount of fuel is displayed. The remaining amount of fuel is displayed based on the output data of a remaining fuel amount sensor provided in the fuel tank.

The coolant water temperature display part 418 displays the temperature condition of engine coolant water as operating information of the shovel. According to the illustration of FIG. 5, a bar gauge representing the temperature condition of engine coolant water is displayed. The temperature of engine coolant water is displayed based on the output data of the water temperature sensor 11c provided on the engine 11.

The engine operating time display part 419 displays the cumulative operating time of the engine 11 as operating information of the shovel. According to the illustration of FIG. 5, a cumulative operating time since the restart of counting by the operator is displayed together with a unit "hr (hour)." A lifelong operating time for the entire period after the manufacture of the shovel or a section operating time since the restart of counting by the operator is displayed in the engine operating time display part 419.

The camera image display part 420 displays an image captured by the camera S6. According to the illustration of FIG. 5, an image captured by a back-side camera attached to the rear end of the upper surface of the upper turning body 3 is displayed in the camera image display part 420. A camera image captured by a left-side camera attached to the left end of the upper surface of the upper turning body 3 or a right-side camera attached to the right end of the upper surface of the upper turning body 3 may be displayed in the camera image display part 420. Images captured by two or more of the left-side camera, the right-side camera, and the back-side camera may be displayed side by side in the camera image display part 420. A composite image generated based on multiple camera images captured by at least two of the left-side camera, the right-side camera, and the back-side camera may be displayed in the camera image display part 420. The composite image may be, for example, an overhead view image.

Each camera is installed such that part of the upper turning body 3 is included in the camera image. The operator has a better sense of distance between an object displayed in the camera image display part 420 and the shovel because of inclusion of part of the upper turning body 3 in the displayed image.

In the camera image display part 420, a camera icon 421 representing the orientation of the camera S6 that has captured a currently displayed camera image is displayed. The camera icon 421 is composed of a shovel icon 421a representing the shape of the shovel and a strip-shaped orientation indicator icon 421b representing the orientation of the camera S6 that has captured the currently displayed camera image. The camera icon 421 is a display part that displays information on the settings of the shovel.

According to the illustration of FIG. 5, the orientation indicator icon 421b is displayed below the shovel icon 421a (on the opposite side from an image representing the attachment) to indicate that an image of a space behind the shovel captured with the back-side camera is displayed in the camera image display part 420. For example, when an image captured by the right-side camera is displayed in the camera image display part 420, the orientation indicator icon 421b is displayed to the right of the shovel icon 421a. For example, when an image captured by the left-side camera is displayed in the camera image display part 420, the orientation indicator icon 421b is displayed to the left of the shovel icon 421a.

For example, the operator can switch an image displayed in the camera image display part 420 to an image captured by another camera or the like by depressing an image change switch provided in the cabin 10.

If the shovel is not provided with the camera S6, different information may be displayed instead of the camera image display part 420.

Figure 6:
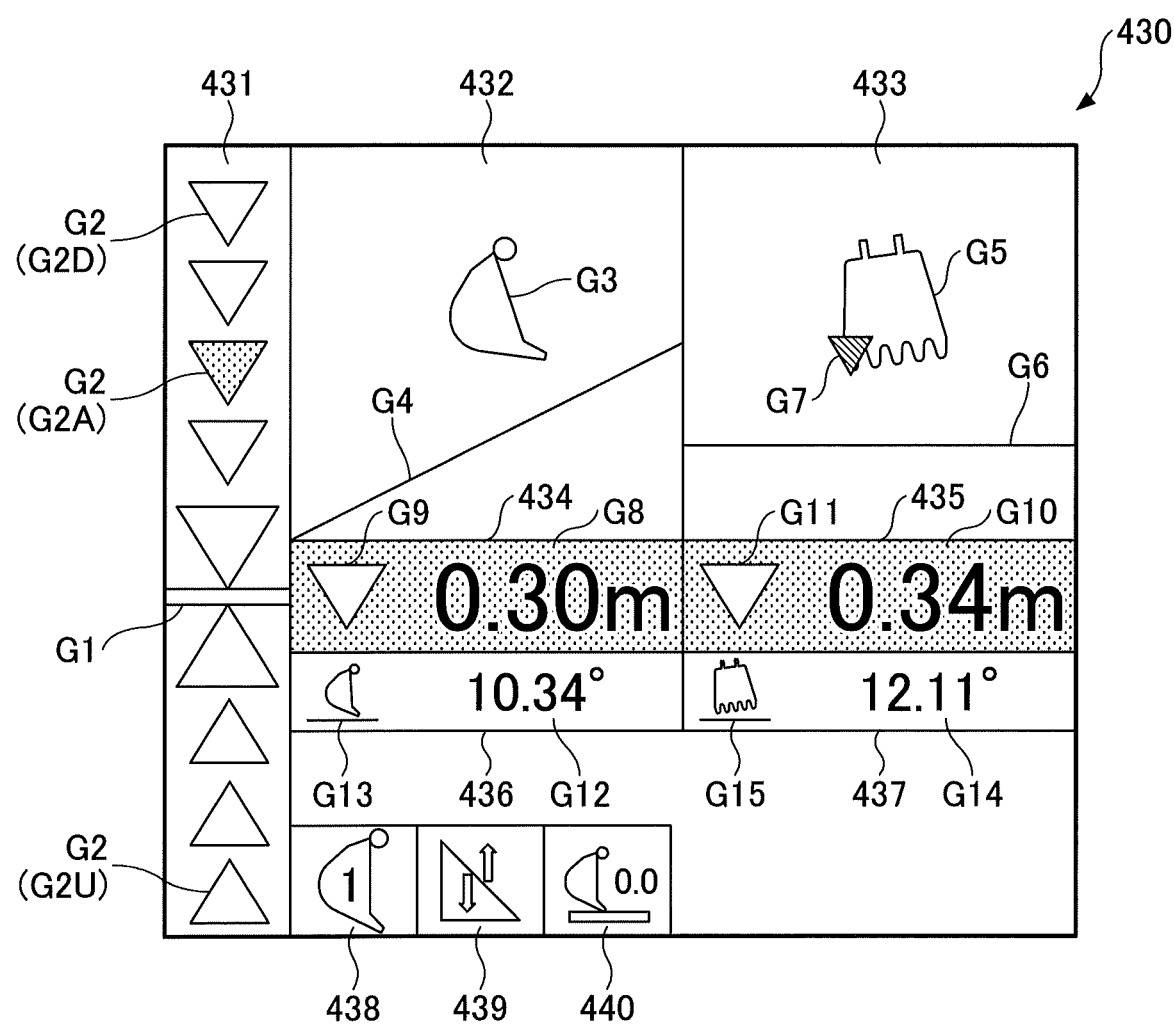
FIG. 6 is a diagram illustrating an example of a work guidance display part.

The work guidance display part 430 displays guidance information for various kinds of work. FIG. 6 is a diagram illustrating an example of the work guidance display part 430 of FIG. 5. According to the illustration of FIG. 6, the work guidance display part 430 includes a position indicator image 431, a first target work surface display image 432, a second target work surface display image 433, a bucket left end information image 434, a bucket right end information image 435, a side view numerical value information image 436, a front view numerical value information image 437, an attachment image 438, a distance display format image 439, and a target setting image 440, which display tooth tip guidance information that is an example of the working part guidance information.

The position indicator image 431 is an example of a first image that represents a change in the size of a relative distance from the working part (for example, tooth tip) of the bucket 6 to a target work surface by a change in the display position of a graphic associated with the working part of the bucket 6 relative to the display position of a graphic associated with the target work surface. According to the illustration of FIG. 6, the position indicator image 431 is a bar gauge of vertically arranged graphics (segments). The position indicator image 431 includes a target segment G1 as a first graphic and multiple segments G2 as a second graphic. The first image represents a change in the size of a relative distance from the working part of the bucket 6 to a target work surface by, for example, changing an indicator position, namely, displaying one of the segments G2 in a manner different from the other segments G2.

The target segment G1 is a graphic representing the position of the target work surface. According to this embodiment, the target segment G1 is a (rectilinear or rectangular) graphic indicating that the relative distance from the working part of the bucket 6 to the target work surface is within a predetermined range. The predetermined range is a range preset as an appropriate relative distance range. That the relative distance is within a predetermined range means that the working part of the bucket 6 is at an appropriate position. The target segment G1 is placed at the same height as a second image. The second image represents a change in the size of a distance from the working part of the attachment to a target work surface by changing a display format in the same part. The display format in the same part includes, for example, an icon, a background color, a numerical value, etc. A change in the display format of the second image is a change in at least one of an icon shape, a color, and a numerical value. According to this embodiment, the second image is a combination of the bucket left end information image 434 and the bucket right end information image 435. The target segment G1 is placed at the same height as each of the bucket left end information image 434 and the bucket right end information image 435. For example, the target segment G1, the bucket left end information image 434, and the bucket right end information image 435 are arranged such that their respective vertical centers are at the same height.

Each segment G2 is a graphic corresponding to a predetermined relative distance. A segment G2 corresponding to a smaller relative distance is placed closer to the target segment G1. A segment G2 corresponding to a greater relative distance is placed farther from the target segment G1. Each segment G2 represents the direction of movement of the bucket 6 as well as the relative distance. The direction of movement of the bucket 6 is a direction to move the working part of the bucket 6 toward the target work surface. According to this embodiment, a segment G2D indicates that the bucket 6 approaches the target work surface by being moved downward, and a segment G2U indicates that the bucket 6 approaches the target work surface by being moved upward.

The position indicator image 431 displays a segment G2 corresponding to an actual relative distance from the working part of the bucket 6 to the target work surface in a predetermined color different from the color of the other segments G2. FIG. 6 indicates the segment G2 displayed in a color different from the color of the other segments G2 by a segment G2A. The position indicator image 431 indicates the relative distance and the direction of movement by displaying the segment G2A in a predetermined color. As the relative distance from the working part of the bucket 6 to the target work surface becomes greater, a segment G2 more distant from the target segment G1 is displayed in a predetermined color as the segment G2A. As the relative distance from the working part of the bucket 6 to the target work surface becomes smaller, a segment G2 closer to the target segment G1 is displayed in a predetermined color as the segment G2A. Thus, the segment G2A is so displayed as to vertically change the position as the relative distance changes.

When the relative distance is greater than the maximum value of the predetermined range, the segment G2A is displayed in a first color. The first color is, for example, an inconspicuous color such as white or yellow. This is because when the relative distance is greater than the maximum value of the predetermined range, there is little need to alert the operator. The maximum value of the predetermined range corresponds to a position higher than the target work surface, and "when the relative distance is greater than the maximum value of the predetermined range" means, for example, when the working part of the bucket 6 is positioned conspicuously higher than the target work surface. Furthermore, when the relative distance is greater than the maximum value of the predetermined range, the segment G2A is displayed in a second color. The second color is a conspicuous color such as green. This is for notifying the operator that the bucket 6 is at an appropriate position in an easy-to-understand manner. Furthermore, when the relative distance is smaller than the minimum value of the predetermined range, the segment G2A is displayed in a third color. The third color is a conspicuous color such as red. This is for alerting the operator that the target work surface may be excessively scraped by the working part of the bucket 6. The minimum value of the predetermined range corresponds to a position lower than the target work surface, and "when the relative distance is smaller than the minimum value of the predetermined range" means, for example, when the working part of the bucket 6 is positioned conspicuously deeper than the target work surface.

When the actual relative distance of the bucket 6 is within the predetermined range, the position indicator image 431 displays the target segment G1 in a predetermined color different from the color of the other segments. That is, the position indicator image 431 indicates that the relative distance is within the predetermined range by displaying the target segment G1 in a predetermined color. The target segment G1 is preferably displayed in the above-described second color. This is for notifying the operator that the bucket 6 is at an appropriate position in an easy-to-understand manner.

While the segment G2A and the target segment G1 are displayed in a predetermined color, the other segments G2 may be displayed in an inconspicuous color (color equal or similar to a background color) or may not be displayed. The first target work surface display image 432 schematically shows the relationship between the bucket 6 and the target work surface. In the first target work surface display image 432, the bucket 6 and the target work surface as viewed from the side are schematically shown by a bucket icon G3 and a target work surface image G4. The bucket icon G3 is a graphic representing the bucket 6 and is shown in the shape of the bucket 6 as viewed from the side. The target work surface image G4 is a graphic representing ground as the target work surface, and is shown in the shape as viewed from the side the same as the bucket icon G3. The target work surface image G4 may be displayed with, for example, the angle formed between a line segment representing the target work surface and a horizontal line in a vertical plane longitudinally intersecting the bucket 6 (target slope angle; hereinafter referred to as "longitudinal inclination angle"). The vertical interval between the bucket icon G3 and the target work surface image G4 may be so displayed as to vary as the actual distance between the working part (for example, leading edge) of the bucket 6 and the target work surface changes. Likewise, the relative inclination angle between the bucket icon G3 and the target work surface image G4 may be so displayed as to vary as the actual relative inclination angle between the bucket 6 and the target work surface changes. According to this embodiment, the display height and display angle of the target work surface image G4 vary with the bucket icon G3 being fixed. Alternatively, the display height and display angle of the bucket icon G3 may vary with the target work surface image G4 being fixed, or the display height and display angle of each of the bucket icon G3 and the target work surface image G4 may vary.

The second target work surface display image 433 schematically shows the relationship between the bucket 6, the target work surface, and the working part. In the second target work surface display image 433, the bucket 6, the target work surface, and the working part as viewed by the operator seated in the cabin 10 and looking forward from the shovel are schematically shown by a bucket icon G5, a target work surface image G6, and a working part image G7. The bucket icon G5 is a graphic representing the bucket 6 and is shown in the shape of the bucket 6 as viewed by the operator seated in the cabin 10 and looking forward from the shovel. The target work surface image G6 is a graphic representing ground (including actually invisible ground) as the target work surface, and like the bucket icon G5, is shown in the shape of the target work surface as viewed by the operator seated in the cabin 10 and looking forward from the shovel. The target work surface image G6 may be displayed with the angle formed between a line segment representing the target work surface and a horizontal line in a vertical plane transversely intersecting the bucket 6 (target slope angle; hereinafter referred to as "transverse inclination angle"). The working part image G7 is a graphic indicating the working part of the bucket 6. The working part is part of the leading edge of the bucket 6 selected by the operator. The operator may select the left end (tooth tip at the left end), the right end (tooth tip at the right end), the center (central tooth tip), etc., of the leading edge of the bucket 6. The right and left here refers to the right and left as viewed by the operator seated in the cabin 10 and looking forward from the shovel. According to the illustration of FIG. 6, the left end of the bucket 6 is selected as the working part. Therefore, the working part image G7 is displayed over the left end of the leading edge of the bucket icon G5. The vertical interval between the bucket icon G5 and the target work surface image G6 may be so displayed as to vary as the actual distance between the leading edge of the bucket 6 and the target work surface changes. Likewise, the relative inclination angle between the bucket icon G5 and the target work surface image G6 may be so displayed as to vary as the actual relative inclination angle between the bucket 6 and the target work surface changes. The working part image G7 corresponds to the position indicator image 431. Specifically, the distance between the target work surface image G6 and the working part image G7 corresponds to the distance between the target segment G1 and the segment G2A in the position indicator image 431.

The operator can understand the positional relationship between the bucket 6 and the target work surface and the approximate longitudinal inclination angle of the target work surface by looking at the first target work surface display image 432. In the first target work surface display image 432, the target work surface image G4 may be displayed with an inclination angle that is greater than actually is to improve visibility for the operator. When the operator desires to know a precise longitudinal inclination angle, the operator can know an actual longitudinal inclination angle by looking at the value of the longitudinal inclination angle displayed together with the target work surface image G4. The same applies to the second target work surface display image 433.

The bucket left end information image 434 serving as the second image displays the distance between the left end of the leading edge of the bucket 6 and the target work surface. According to the illustration of FIG. 6, the bucket left end information image 434 is displayed under the first target work surface display image 432. The bucket left end information image 434 displays a left end distance G8 and a direction icon G9. The left end distance G8 is a numerical value indicating the distance between the left end of the leading edge of the bucket 6 and the target work surface. When the left end of the leading edge of the bucket 6 is positioned above the target work surface, the left end distance G8 is shown as a positive value. When the left end of the leading edge of the bucket 6 is positioned below the target work surface, the left end distance G8 is shown as a negative value. According to the illustration of FIG. 6, the left end distance G8 is 0.30 m. The operator can know the exact left end distance by looking at the left end distance G8 numerically displayed in the bucket left end information image 434. The direction icon G9 is a graphic indicating the direction of movement of the bucket 6. The direction of movement of the bucket 6 is a direction to move the left end of the leading edge of the bucket 6 toward the target work surface. According to the illustration of FIG. 6, the left end of the leading edge of the bucket 6 is positioned above the target work surface. Therefore, the direction icon G9 points downward. The background color of the direction icon G9 and the bucket left end information image 434 is so displayed as to change the left end distance G8 changes. As the direction icon G9, for example, the shape of the segment G2A displayed in the case where the left end distance G8 is adopted as the relative distance may be displayed or a combination of the shape of the segment G2A and the shape of the target segment G1 may be displayed.

The bucket right end information image 435 serving as the second image displays the distance between the right end of the leading edge of the bucket 6 and the target work surface. According to the illustration of FIG. 6, the bucket right end information image 435 is displayed to the right of and in contact with the bucket left end information image 434 under the second target work surface display image 433. That is, the bucket left end information image 434 and the bucket right end information image 435 are displayed at the same height. The bucket right end information image 435 displays a right end distance G10 and a direction icon G11. The right end distance G10 is a numerical value indicating the distance between the right end of the leading edge of the bucket 6 and the target work surface. When the right end of the leading edge of the bucket 6 is positioned above the target work surface, the right end distance G10 is shown as a positive value. When the right end of the leading edge of the bucket 6 is positioned below the target work surface, the right end distance G10 is shown as a negative value. According to the illustration of FIG. 6, unlike the value of the left end distance G8, the right end distance G10 is 0.34 m. This is because the leading edge of the bucket 6 is inclined to the target work surface according to the illustration of FIG. 6. The operator can know the exact right end distance by looking at the right end distance G10 numerically displayed in the bucket right end information image 435. The direction icon G11 is a graphic indicating the direction of movement of the bucket 6. The direction of movement of the bucket 6 is a direction to move the right end of the leading edge of the bucket 6 toward the target work surface. According to the illustration of FIG. 6, the right end of the leading edge of the bucket 6 is positioned above the target work surface. Therefore, the direction icon G11 points downward. The background color of the direction icon G11 and the bucket right end information image 435 is so displayed as to change as the right end distance G10 changes. As the direction icon G11, for example, the shape of the segment G2A displayed in the case where the right end distance G10 is adopted as the relative distance may be displayed or a combination of the shape of the segment G2A and the shape of the target segment G1 may be displayed.

Specifically, the background of the bucket left end information image 434 is displayed in a first color when the left end distance G8 is greater than the maximum value of the predetermined range. The first color is, for example, an inconspicuous color such as white or yellow. This is because when the left end distance G8 is greater than the maximum value of the predetermined range, there is little need to alert the operator. Furthermore, the background of the bucket left end information image 434 is displayed in a second color when the left end distance G8 is within the predetermined range. The second color is a conspicuous color such as green. This is for notifying the operator that the left end of the leading edge of the bucket 6 is at an appropriate position in an easy-to-understand manner. Furthermore, the background of the bucket left end information image 434 is displayed in a third color when the left end distance G8 is smaller than the minimum value of the predetermined range. The third color is a conspicuous color such as red. This is for alerting the operator that the target work surface may be excessively scraped by the left end of the leading edge of the bucket 6. The same applies to the bucket right end information image 435.

The side view numerical value information image 436 displays the relationship between the bucket 6 and the target work surface as viewed from the side. According to the illustration of FIG. 6, the side view numerical value information image 436 is displayed under the bucket left end information image 434. The side view numerical value information image 436 displays a longitudinal bucket angle G12 and a longitudinal bucket icon G13. The longitudinal bucket angle G12 is a numerical value indicating the relative angle between the back surface of the bucket 6 and the target work surface in a vertical plane longitudinally intersecting the bucket 6. According to the illustration of FIG. 6, the longitudinal bucket angle G12 is 10.34°. The operator can know the exact longitudinal bucket angle by looking at the value of the longitudinal bucket angle G12 numerically displayed in the side view numerical value information image 436. The longitudinal bucket icon G13 is a graphic schematically representing the longitudinal bucket angle G12. The longitudinal bucket icon G13 is displayed, for example, in the shape of the bucket 6 and the target work surface as viewed from the side of the bucket 6 with reference to the target work surface. According to this embodiment, the inclination of the bucket portion of the longitudinal bucket icon G13 is shown at three levels of inclination. The three levels of inclination show that the longitudinal bucket angle G12 is a positive value, zero, and a negative value. Alternatively, the inclination of the bucket portion of the longitudinal bucket icon G13 may be fixed or may be so displayed as to change as the longitudinal bucket angle G12 changes.

The front view numerical value information image 437 displays the relationship between the bucket 6 and the target work surface as viewed by the operator seated in the cabin 10 and looking forward from the shovel. According to the illustration of FIG. 6, the front view numerical value information image 437 is displayed to the right of and in contact with the side view numerical value information image 436 under the bucket right end information image 435. The front view numerical value information image 437 displays a transverse bucket angle G14 and a transverse bucket icon G15. The transverse bucket angle G14 is a numerical value indicating the relative angle between the tooth tip line of the bucket 6 and the target work surface in a vertical plane transversely intersecting the bucket 6. The tooth tip line of the bucket 6 is, for example, a line connecting the respective tips of the teeth. According to the illustration of FIG. 6, the transverse bucket angle G14 is 12.11°. The operator can know the exact transverse bucket angle by looking at the value of the transverse bucket angle G14 numerically displayed in the front view numerical value information image 437. The transverse bucket icon G15 is a graphic schematically representing the transverse bucket angle G14. The transverse bucket icon G15 is displayed, for example, in the shape of the bucket 6 and the target work surface as viewed by the operator seated in the cabin 10 and looking forward from the shovel with reference to the target work surface. According to this embodiment, the inclination of the bucket portion of the transverse bucket icon G15 is shown at three levels of inclination. The three levels of inclination show that the transverse bucket angle G14 is a positive value, zero, and a negative value. Alternatively, the inclination of the bucket portion of the transverse bucket icon G15 may be fixed or may be so displayed as to change as the transverse bucket angle G14 changes.

The attachment image 438 is an image representing an attachment that is attached. According to the illustration of FIG. 6, the attachment image 438 is displayed at the lower end of the work guidance display part 430. Various end attachments such as the bucket 6, a rock drill, a grapple, and a lifting magnet are attachable to the shovel. The attachment image 438 displays, for example, marks shaped like these end attachments and numbers corresponding to the end attachments. The numbers of the end attachments are registered in advance. According to the illustration of FIG. 6, the attachment image 438 indicates that the bucket 6 corresponding to #1 is attached as an end attachment. When a rock drill is attached as an end attachment, for example, a rock drill-shaped mark is displayed together with a number corresponding to a rock drill in the attachment image 438.

The distance display format image 439 is an image representing the display format of the left end distance G8 displayed in the bucket left end information image 434 and the right end distance G10 displayed in the bucket right end information image 435. According to the illustration of FIG. 6, the distance display format image 439 is displayed to the right of and in contact with the attachment image 438 at the lower end of the work guidance display part 430. The left end distance G8 and the right end distance G10 are displayed in, for example, either a vertical distance display format or a normal distance display format. The vertical distance is a distance in a vertical direction relative to the target work surface. The normal distance is a distance in a normal direction relative to the target work surface. The operator can choose the display format of the left end distance G8 and the right end distance G10 between the vertical distance display format and the normal distance display format. The left end distance G8 and the right end distance G10 are displayed in the display format chosen by the operator. The distance display format image 439 displays a mark representing the display format chosen by the operator. According to the illustration of FIG. 6, the left end distance G8 and the right end distance G10 are displayed in the vertical distance display format.

The target setting image 440 is an image indicating whether the target value and the target work surface have been set. According to the illustration of FIG. 6, the target setting image 440 is displayed to the right of and in contact with the distance display format image 439 at the lower end of the work guidance display part 430. The target setting image 440 displays a mark corresponding to whether the target value and the target work surface have been set. According to the illustration of FIG. 6, the target setting image 440 shows that the target value and the target work surface have been set.

Here, changes in the work guidance display part 430 are described with reference to FIGS. 6 through 9. Each of FIGS. 6 through 9 is a diagram illustrating an example of the work guidance display part 430. The work guidance display parts 430 of FIGS. 6 through 9 correspond to different relative distances. According to each of the illustrations of FIGS. 6 through 9, the working part is the left end of the leading edge of the bucket 6, and the relative distance is the left end distance G8. In the following, −0.03 m or more and 0.03 m or less is set as a first predetermined range of the relative distance, and −0.01 m or more and 0.01 m or less is set as a second predetermined range of the relative distance.

According to the illustration of FIG. 6, the relative distance (the left end distance G8) is 0.30 m, and the right end distance G10 is 0.34 m. In this case, a segment G2 corresponding to 0.30 m is displayed as the segment G2A. According to the illustration of FIG. 6, the segment G2A is the third segment G2 from the top. Because the working part of the bucket 6 is positioned above the target work surface, the segment G2A points downward. Each of the relative distance (the left end distance G8) and the right end distance G10 is greater than the first predetermined range. Therefore, the segment G2A, the background of the bucket left end information image 434 as the second image, and the background of the bucket right end information image 435 also as the second image are displayed in the first color, and the target segment G1 has only its outline displayed. The target work surface images G4 and G6 are displayed lower than the bucket icons G3 and G5, respectively, by a distance corresponding to the relative distance (0.30 m). A graphic of the same shape as the segment G2A is displayed as the direction icons G9 and G11.

Figure 7:
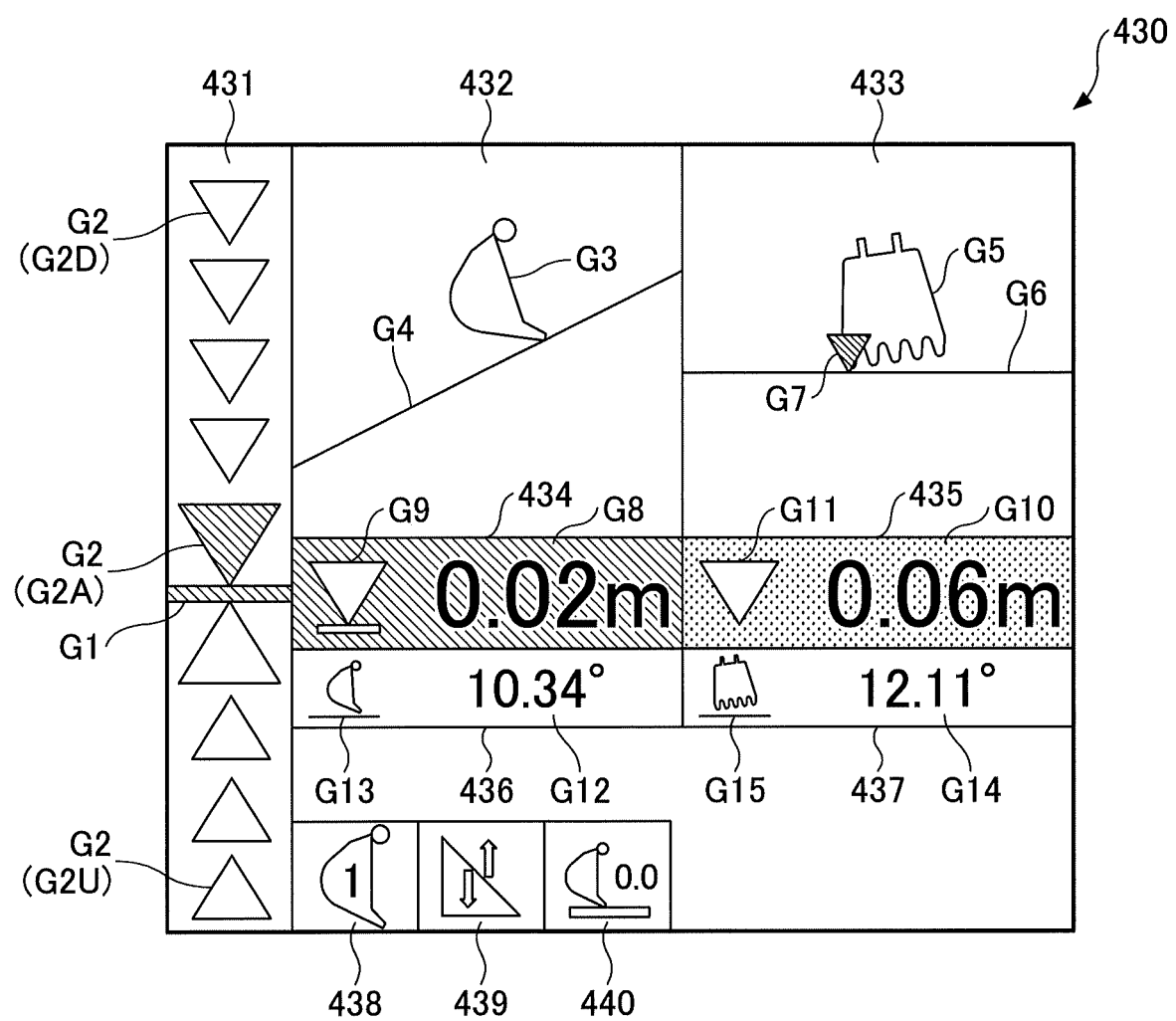
FIG. 7 is a diagram illustrating an example of the work guidance display part.

FIG. 7 illustrates a display example in the case where the bucket 6 is further lowered toward the target work surface than in the case of FIG. 6. According to the illustration of FIG. 7, the relative distance (the left end distance G8) is 0.02 m, and the right end distance G10 is 0.06 m. In this case, a segment G2 corresponding to 0.02 m is displayed as the segment G2A. According to the illustration of FIG. 7, the segment G2A is the fifth segment G2 from the top. Because the working part of the bucket 6 is positioned above the target work surface, the segment G2A points downward. The relative distance (the left end distance G8) is within the first predetermined range. Therefore, the segment G2A, the target segment G1, and the background of the bucket left end information image 434 as the second image are displayed in the second color, which is a conspicuous color such as green. Therefore, it is possible to notify the operator that the left end of the leading edge of the bucket 6 is at an appropriate position in an easy-to-understand manner. Furthermore, the right end distance G10 is outside the first predetermined range. Therefore, the background of the bucket right end information image 435 is displayed in the first color, which is an inconspicuous color such as white or yellow. The target work surface images G4 and G6 are displayed lower than the bucket icons G3 and G5, respectively, by a distance corresponding to the relative distance (0.02 m). As a result, as illustrated in FIG. 7, the target work surface images G4 and G6 are displayed closer to the bucket icons G3 and G5 than in the illustration of FIG. 6. A graphic of the same shape as the segment G2A and the target segment G1 is displayed as the direction icon G9. Furthermore, a graphic of the same shape as the segment G2A is displayed as the direction icon G11. This means that only the fourth segment G2 from the top is displayed in a predetermined color in the position indicator image 431 if the right end distance G10 is employed as the relative distance. As illustrated in FIG. 7, the segment G2A displayed when the relative distance is within the first predetermined range is preferably larger in size than the other segments G2. This is for notifying the operator that the working part of the bucket 6 is at an appropriate position in an easy-to-understand manner.

Figure 8:
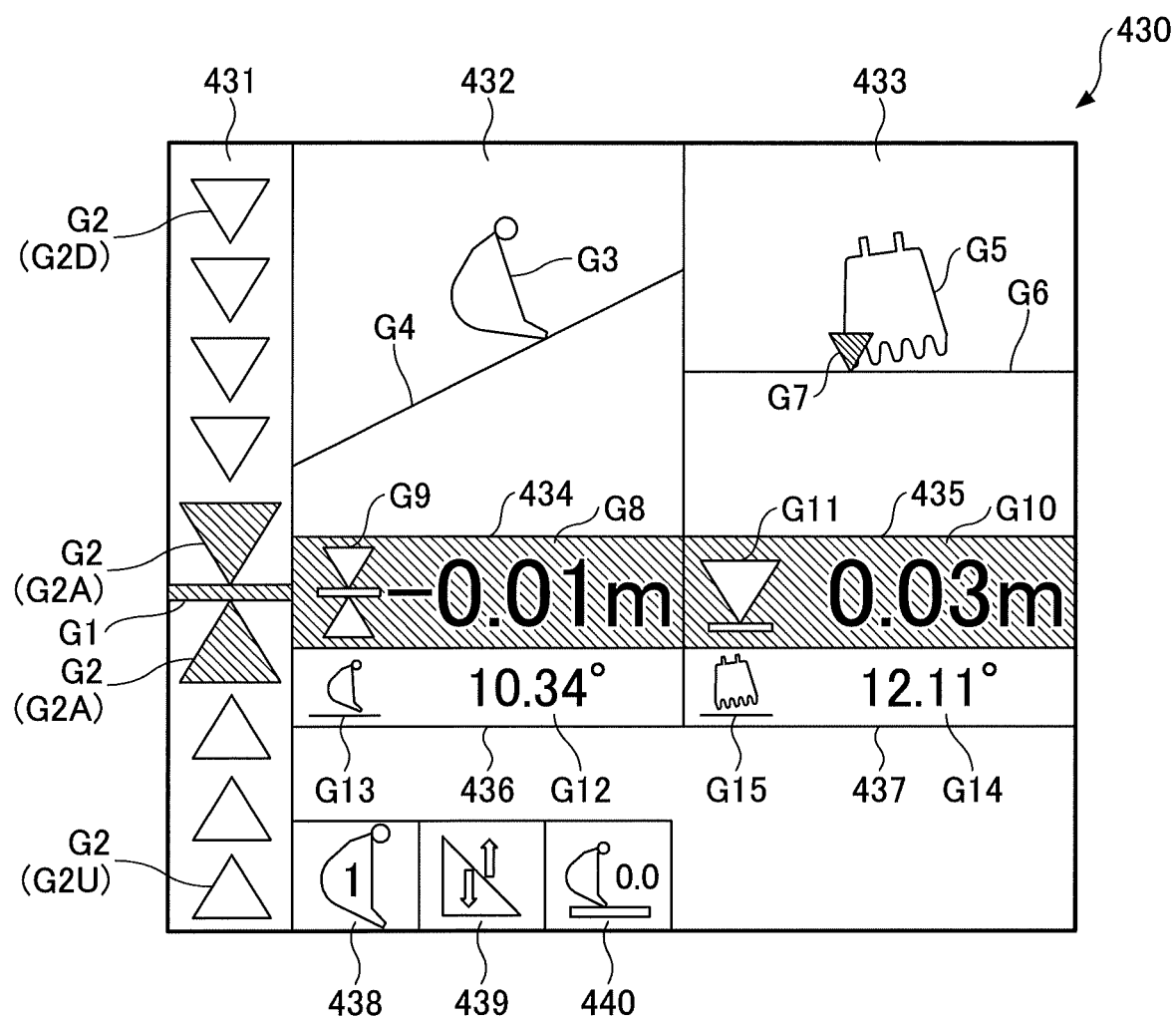
FIG. 8 is a diagram illustrating an example of the work guidance display part.

FIG. 8 illustrates a display example in the case where the bucket 6 is further lowered toward the target work surface than in the case of FIG. 7. According to the illustration of FIG. 8, the relative distance (the left end distance G8) is −0.01 m, and the right end distance G10 is 0.03 m. In this case, segments G2 corresponding to −0.01 m are displayed as the segments G2A. According to the illustration of FIG. 8, the segments G2A are the fifth and sixth segments G2 from the top. This is for indicating that the relative distance is within the second predetermined range by the segments G2A. The relative distance (the left end distance G8) is within the second predetermined range, and the right end distance G10 is within the first predetermined range. Therefore, the two segments G2A, the target segment G1, the background of the bucket left end information image 434, and the background of the bucket right end information image 435 are each displayed in the second color, which is a conspicuous color such as green. At this point, as illustrated in FIG. 8, the two segments G2A, the target segment G1, the bucket left end information image 434, and the bucket right end information image 435 are displayed in the second color at the same height. Therefore, the work guidance display part 430 can notify the operator that each of the left end of the leading edge and the right end of the leading edge of the bucket 6 is at an appropriate position in an easy-to-understand manner. The target work surface images G4 and G6 are displayed lower than the bucket icons G3 and G5, respectively, by a distance corresponding to the relative distance (−0.01 m). As the direction icon G9, the two segments G2A and a third graphic are displayed. The third graphic is a graphic representing the target work surface. According to the illustration of FIG. 8, the third graphic has the same shape as the target segment G1. The target segment G1 as the first graphic and the third graphic are displayed at the same height. Furthermore, as the direction icon G11, a graphic of the same shape as the upper segment G2A and the target segment G1 is displayed. This means that only the upper segment G2A and the target segment G1 are displayed in a predetermined color in the position indicator image 431 if the right end distance G10 is employed as the relative distance.

Figure 9:
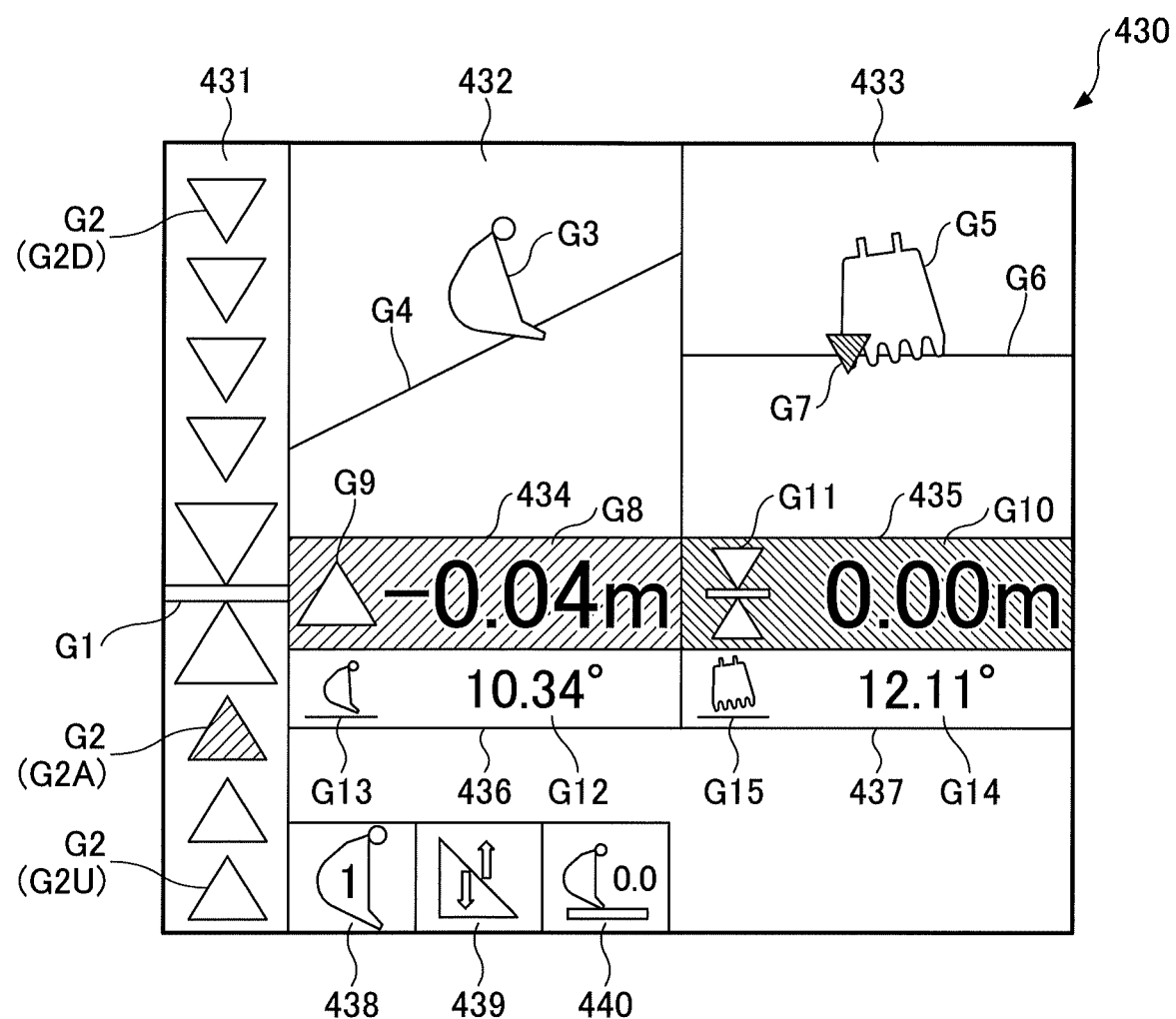
FIG. 9 is a diagram illustrating an example of the work guidance display part.

According to the illustration of FIG. 9, the relative distance (the left end distance G8) is −0.04 m, and the right end distance G10 is 0.00 m. In this case, a segment G2 corresponding to −0.04 m is displayed as the segment G2A. According to the illustration of FIG. 9, the segment G2A is the seventh segment G2 from the top. Because the working part of the bucket 6 is positioned below the target work surface, the segment G2A points upward. As the relative distance (the left end distance G8) is outside the first predetermined range, the segment G2A and the background of the bucket left end information image 434 are displayed in the third color. Furthermore, the right end distance G10 is within the second predetermined range. Therefore, the background of the bucket right end information image 435 is displayed in the second color. The target work surface images G4 and G6 are displayed lower than the bucket icons G3 and G5, respectively, by a distance corresponding to the relative distance (−0.04 m). As a result, as illustrated in FIG. 9, the target work surface images G4 and G6 are displayed, overlapping the bucket icons G3 and G5, respectively. As the direction icon G9, a graphic of the same shape as the segment G2A is displayed. As the direction icon G11, a graphic of the same shape as the direction icon G9 of FIG. 8 is displayed. This means that the two segments G2A and the target segment G1 are displayed as illustrated in FIG. 8 in the position indicator image 431 if the right end distance G10 is employed as the relative distance.

As described above, according to an embodiment of the present invention, when the relative distance is within a predetermined range, the segment G2A, the target segment G1, and the background of at least one of the bucket left end information image 434 and the bucket right end information image 435 as the second image are displayed in the second color at the same height. A set of images displayed in the second color at the same height enjoys extremely high visibility. Therefore, for example, by seeing the work guidance display part 430 in the peripheral vision, the operator can easily understand that the distance between the working part of the bucket 6 and the target work surface is within an appropriate range, that is, that the working part of the bucket 6 is at an appropriate position.

In addition, the operator can easily understand the approximate transverse bucket angle G14 by the background color of the bucket left end information image 434 and the bucket right end information image 435 as the second image. For example, when the background of each of the bucket left end information image 434 and the bucket right end information image 435 is displayed in the second color, the transverse bucket angle G14 is considered sufficiently small. When the background of both of the bucket left end information image 434 and the bucket right end information image 435 is not displayed in the second color, the transverse bucket angle G14 is considered large. Thus, the operator can easily understand the approximate transverse bucket angle G14 by seeing the work guidance display part 430 in her/his peripheral vision, for example.

A preferred embodiment of the present invention is described above. The present invention, however, is not limited to the above-described embodiment. Various variations, replacements, etc., may be applied to the above-described embodiment without departing from the scope of the present invention. Furthermore, the technical features described with reference to the above-described embodiment may be suitably combined as long as causing no technical contradiction.

For example, the machine guidance device 50 is configured as a control device separate from the controller 30 according to the above-described embodiment, but the present invention is not limited to this configuration. For example, the machine guidance device 50 may be integrated into the controller 30.

Furthermore, the output image Gx, which is displayed on the display device D3 installed in the cabin 10 according to the above-described embodiment, may be displayed on a display device provided outside the cabin 10. For example, the output image Gx may be displayed on a display device connected to a management apparatus such as a server installed in an external facility such as a management center. In this case, information on the output image Gx is transmitted to the outside via a communications device attached to the shovel. Alternatively, the output image Gx may be displayed on a display device pertaining to a remote control device for the shovel. Examples of remote control devices for the shovel include a smartphone, a tablet PC, a notebook PC, etc.

Furthermore, the display device D3 may be a wearable display worn by the operator of the shovel, such as smartglasses, a head-mounted display, or the like. In this case, the wearable display may be equipped with a camera for capturing an image of a scene actually seen by the operator, and may display various kinds of information such as the working part guidance information in an augmented reality manner. "Displaying in an augmented reality manner" means displaying information using AR techniques. In this case, the operator can perform excavation work while looking at the working part guidance information virtually displayed near the actual bucket 6 seen through the wearable display.

Furthermore, the display device D3 may be a see-through display such as a see-through organic EL display, a see-through inorganic EL display, or the like. In this case, the display device D3 may be integrated into the windshield FG of the shovel, and may display various kinds of information such as the working part guidance information in an augmented reality manner. In this case, the operator can perform excavation work while looking at the working part guidance information virtually displayed near the actual bucket 6 seen through the windshield FG.

What is claimed is:

1. A shovel comprising:
a lower traveling body;
an upper turning body turnably mounted on the lower traveling body;
a cab mounted on the upper turning body;
an attachment attached to the upper turning body; and
a display device provided in the cab,
wherein the display device is configured to display a first image and a second image, the first image including a first graphic representing a position of a preset target work surface and a second graphic vertically arranged relative to the first graphic, the second graphic including an indicator graphic indicating a distance between a working part of the attachment and the preset target work surface by vertically changing a position thereof as the distance changes, the second image numerically indicating the distance,
the display device is configured to display the first graphic at a same height as the second image regardless of a change in a position of the attachment, and
the display device is configured to display the second image such that a background color of the second image changes to a same color as a color of the first graphic and that a shape of a third graphic included in the second image changes to a shape including a shape of the first graphic, in response to the distance falling within a predetermined range.

2. The shovel as claimed in claim 1, wherein the third graphic represents the target work surface, and the display device is configured to display the third graphic at a same height as the first graphic when the working part is at a same height as the target work surface.

3. The shovel as claimed in claim 1, wherein
the first graphic has a rectilinear or rectangular shape elongated in a direction perpendicular to a direction in which the second graphic is vertically arranged.

4. The shovel as claimed in claim 1, wherein the display device is configured to display the second image such that the background color of the second image changes to the same color as the color of the first graphic and that the shape of the third graphic included in the second image changes to the shape including the shape of the first graphic, when the working part coincides with the target work surface.

5. The shovel as claimed in claim 1, wherein
the display device is configured to display an output image including the first image and the second image, and
the same color traverses the first graphic and a background of the second image in a lateral direction of the output image.

6. The shovel as claimed in claim 5, wherein the same color is different from a color in which a portion of the output image other than the first graphic and the background of the second image is displayed when the distance between the working part and the target work surface is within the predetermined range.

7. The shovel as claimed in claim 1, wherein the display device is configured to horizontally display the third graphic and a numerical value indicating the distance in the second image.

8. The shovel as claimed in claim 1, wherein the background color of the second image changes as the indicator graphic vertically changes the position thereof in the first image in response to a change in the distance.

9. The shovel as claimed in claim 1, wherein the background color of the second image changes according to information shown in the first image.

10. The shovel as claimed in claim 9, wherein the background color of the second image changes according to the distance.

11. The shovel as claimed in claim 9, wherein the background color of the second image changes according to the position of the indicator graphic.

12. A shovel comprising:
a lower traveling body;
an upper turning body turnably mounted on the lower traveling body;
a cab mounted on the upper turning body;
an attachment attached to the upper turning body; and
a display device provided in the cab,
wherein the display device is configured to display a first image and a second image, the first image including a first graphic representing a position of a preset target work surface and a second graphic vertically arranged relative to the first graphic, the second graphic including an indicator graphic indicating a distance between a working part of the attachment and the preset target work surface by vertically changing a position thereof as the distance changes, the second image numerically indicating the distance,
the display device is configured to display the first graphic at a same height as the second image regardless of a change in a position of the attachment, and
the display device is configured to display the second image such that a background color of the second image changes to a same color as a color of a combination of the first graphic and the indicator graphic of the first image in response to the distance falling within a predetermined range.

13. A shovel comprising:
a lower traveling body;
an upper turning body turnably mounted on the lower traveling body;
a cab mounted on the upper turning body;
an attachment attached to the upper turning body; and
a display device provided in the cab,
wherein the display device is configured to display a first image and a second image, the first image including a first graphic representing a position of a preset target work surface and a second graphic vertically arranged relative to the first graphic, the second graphic including an indicator graphic indicating a distance between a working part of the attachment and the preset target work surface by vertically changing a position thereof as the distance changes, the second image numerically indicating the distance,
the display device is configured to display the first graphic at a same height as the second image regardless of a change in a position of the attachment,
the display device is configured to display the second image such that a background color of the second image changes,
the second image includes a third graphic indicating a direction of movement of the working part,
a shape of the third graphic changes as the indicator graphic vertically changes the position thereof in the first image in response to the change in the distance, and
the shape of the third graphic of the second image changes to a same shape as a shape of a combination of the first graphic and the indicator graphic of the first image in response to the distance falling within a predetermined range.

\* \* \* \* \*